Aug. 26, 1941.  L. E. LATTA  2,253,631
AUTOMATIC TRAILER BRAKE
Filed March 3, 1941  3 Sheets-Sheet 1

INVENTOR.
Lloyd E. Latta

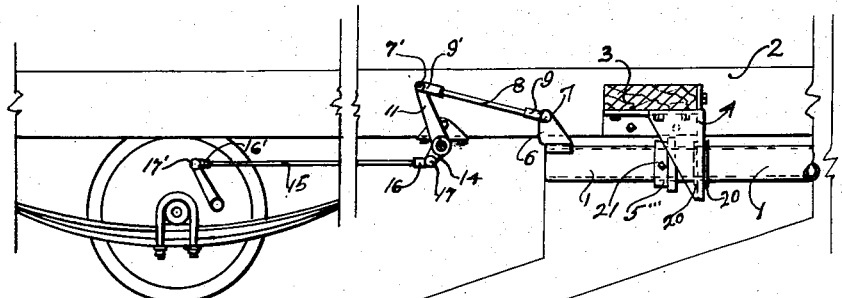
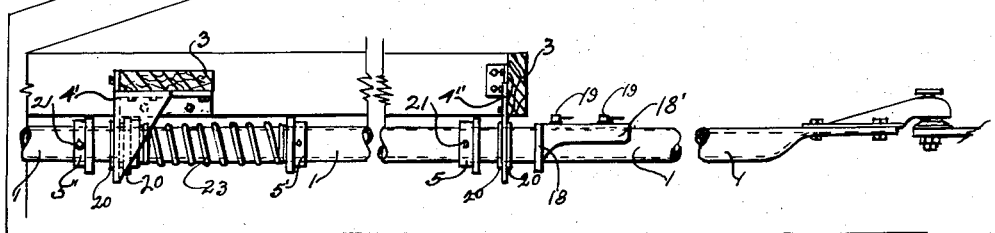
FIG. 2.
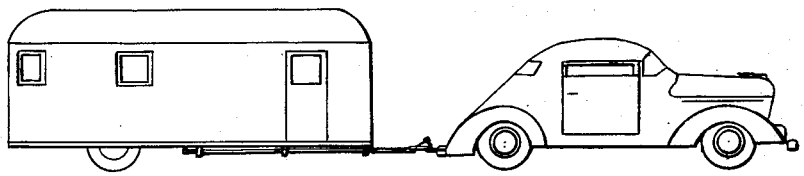
FIG. 3.
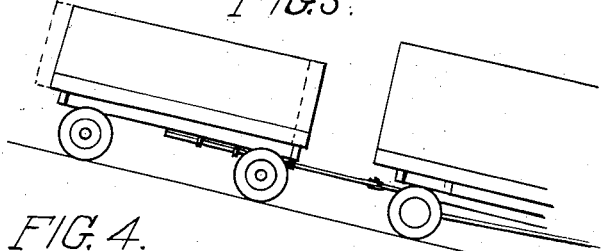
FIG. 4.

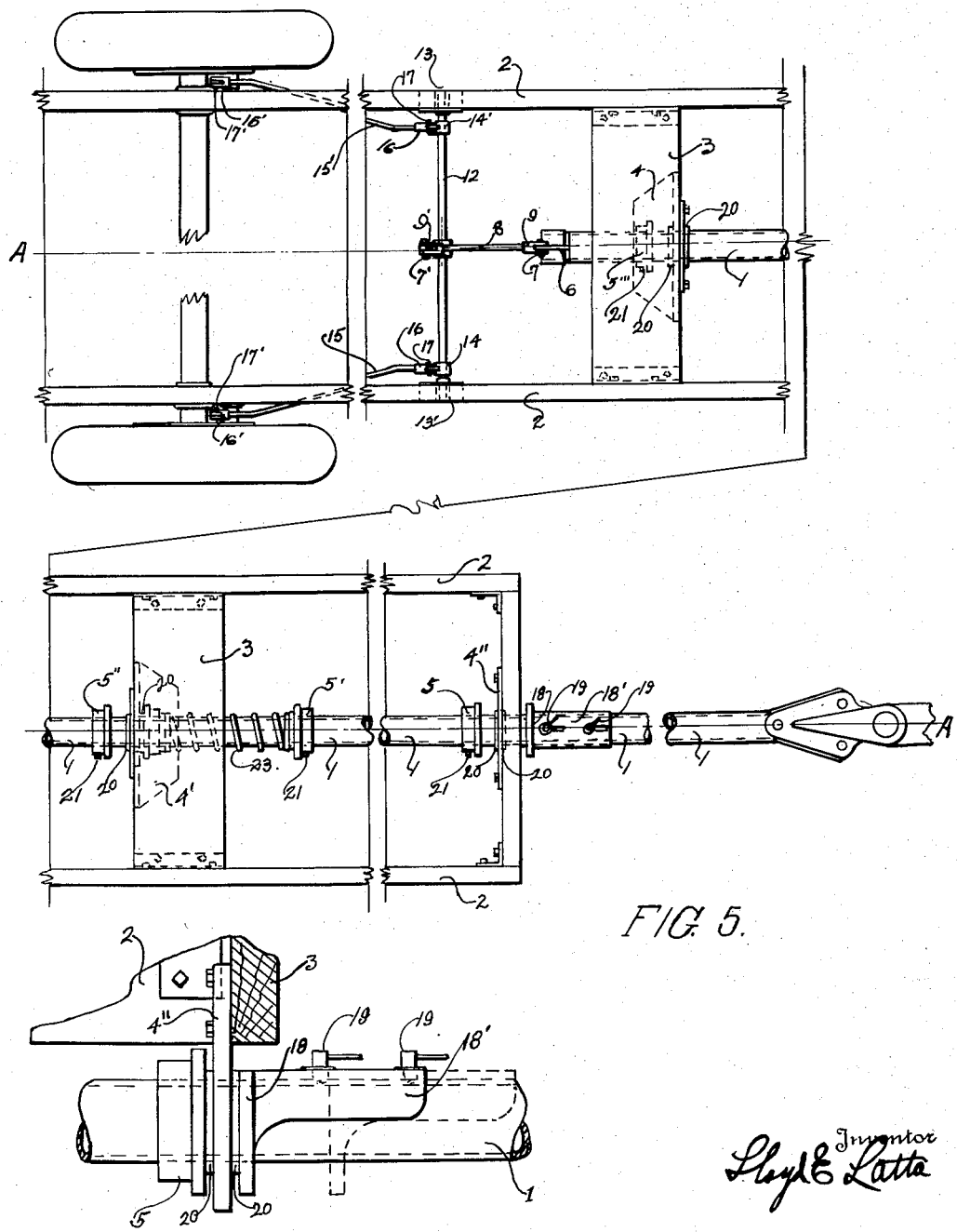

Patented Aug. 26, 1941

2,253,631

UNITED STATES PATENT OFFICE 2,253,631

AUTOMATIC TRAILER BRAKE

Lloyd E. Latta, Jackson, Mich.

Application March 3, 1941, Serial No. 381,526

9 Claims. (Cl. 188—142)

My invention relates to all vehicles or trailers designed to be towed by automobile tractors, trucks or like motor driven vehicles, and particularly to mechanisms designed to automatically apply the brakes to the trailer wheels, whenever the trailer, under and by its own momentum tends to move forward at a greater speed than that of the towing vehicle, as when going down a hill, slowing down or stopping.

Another object of my invention is to provide such an automatically operating braking mechanism as will, in like manner, reverse itself and so release the trailer brakes, as and when the towing vehicle resumes a greater speed than that of the trailer. The action of my automatic brake mechanism is such as to maintain a substantial equilibrium of speeds of towing vehicle and trailer under all conditions of roadway and travel, without attention or effort on the part of the operator.

Another important object of the invention is to provide a mechanism of the character described, embodying a means whereby the same may be locked in a non-operating position, such as will prevent the application of the trailer brakes when the driver wishes to back up or maneuver his train towards the rear.

Another important object of the invention is to provide such a mechanism, embodying therein a means of securely blocking the described mechanism with the brakes upon the wheels of the trailer in a locking position when it is desired to leave the trailer standing secure on an inclined roadway, unhitched from the tractor.

Still another object of the invention is to provide and embody in such a mechanism, a series of stop members, which, while disposed as herein described, so as to allow a sufficient movement forward and rearward of the trailer, with reference to the tractor, to operate the trailer brakes, yet such movement of the trailer is prevented by the said stop-members from being so great as to be detrimental or harmful to either tractor or trailer. Such stop-members being adjustably disposed so as to regulate the braking operations to the requirements of the varying loads of the trailer and its contents.

Another object is to provide such a mechanism, embodying therein an adjustable cushioning member, so disposed that the extreme limits of movement in the braking and releasing of brakes on the trailer wheels may be reached without sudden jerking or jarring effects to tractor or trailer or their respective mechanisms. This cushioning member also being adjustable to different load requirements.

Other objects, improvements and advantages of my invention will be apparent in the course of the following description.

While I have referred herein particularly to the application of my invention to highway tractors and trailers, I desire it to be understood that the invention may also be applied to any other mechanisms where relative speeds of movement or travel of connecting units is to be automatically regulated, co-ordinated and maintained, and which may be governed by such a device as is herein described.

In the accompanying drawings, consisting of three sheets, forming a part of this specification, and in which like numerals are employed to designate like parts throughout the same:

Fig. 2 is a like partial cross section of a trailer chassis, through line A—A in Fig. 5.

Fig. 3 is a side view of an automobile with trailer-house car coupled thereto, the same being in normal pulling position, when my invention is attached to the trailer, and when travelling along a level highway.

Fig. 4 is a partial side view of a tractor with a trailer coupled thereto, the same proceeding in a forward direction down a steep hill.

Fig. 5 shows a top plan view of a chassis frame and running gear of a trailer car, with a preferred form and application of my invention, showing my braking mechanism in braking operation, as more clearly shown in Fig. 2 and Fig. 8.

Figure 1:
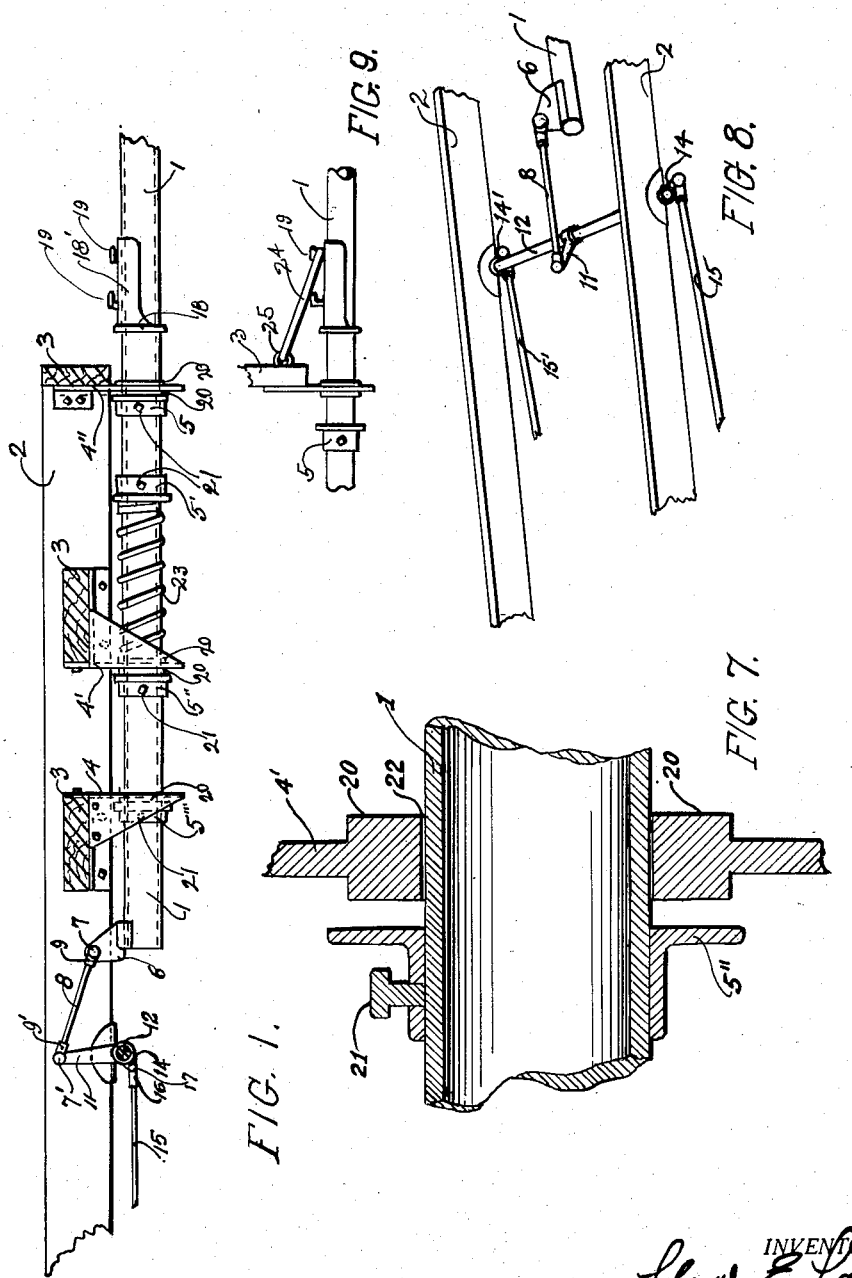
Fig. 1 is a partial cross section of a trailer chassis, through line A—A in Fig. 5, showing the near side of the frame cut away.

Fig. 6 is a side assembly view of a portion of the tongue or pulling member 1, the front hanger 4, the forward stop member 5, and the sliding locking member 18. The purpose of this figure is to more fully illustrate the mounting and the functions of the latter member 18 as hereinafter described in detail.

Fig. 7 is a cross section of one of the several slidable stop members, as numeral 5″, mounted on the tongue member 1 fixedly placed in close proximity to a portion of a hanger member 4 by set screw 21.

Fig. 8 is a top plan view in perspective of a broken section of a trailer frame, showing in detail the location and mounting of the brake cross-rod 12, the rocker arm 11, bell crank brake actuating levers 14—14′, and brake rods 15—15′. In this figure, those parts of the braking mechanism which are shown, are in their respective, relative positions as when the trailer has moved forward along the tongue member 1 when the trailer speed exceeds that of the tractor. The brake rods 15—15' are shown in their respective positions when pulled forward by the brake actuating levers 14—14'.

Fig. 9 is a view showing one method of anchoring the trailer and the tongue member.

Referring now to the drawings in detail, wherein I have illustrated and disclosed a preferred embodiment of my invention.

Numeral 1 designates the tongue or pulling member of the trailer, and at the same time, this member constitutes the mounting for a portion of the brake members, as later more fully described herein. The front end of the tongue is shown in Fig. 1 as broken off, and does not show the ball and socket joint attachment for coupling the trailer to the tractor. I claim no invention of such coupling, and any conventional means in use as a coupler or hitch may be used, and I have elected not to show the same in exact detail or as a part of my invention. Numeral 2 designates side frame members of a trailer chassis. 3—3—3 are cross frame members of the trailer chassis, which carry, attached thereto, hanger brackets 4, 4' and 4" having apertures therethrough, 22, for assembling and suspending the tongue member 1 (see Fig. 7).

5, 5', 5" and 5'" designate slidable, flanged collar stop-members, mounted upon, and which may be fixedly anchored with set screws 21 at any desired position along the tongue member. These stop members are adjustable as to fixed position upon the tongue member, so as to permit a determinable range of travel forward and backward of the hanger brackets, which movement serves to actuate, through this mechanism, the brakes on the trailer wheels.

The numeral 6 designates a spur attachment fixedly attached to the rearward end of the receive yoke pin 7. Numeral 8 designates a con-tongue member 1, the spur being drilled to necting link, threaded at either end to adjustably engage threaded yokes 9 and 9', the latter being drilled to receive yoke pins 7 and 7' respectively. The forward end of said connecting link is rotatably attached by yoke 9 and yoke pin 7 to the spur 6. The rearward end of link 8 is rotatably attached by yoke 9' and yoke pin 7' to rocker arm 11, the upward end of which is drilled to receive yoke pin 7'.

Revolvably mounted at either end in journal bearings 13 and 13' (see Fig. 5), in the side members 2 of the trailer chassis, is a rotatable shaft 12 upon which is fixedly mounted, at its lower end, a rocker arm 11. Also fixedly mounted on the shaft 12, at either end thereof, respectively, are brake rod actuating levers 14 and 14', these being in the nature of a bell crank, and being drilled to receive yoke pins 17.

Numerals 15 and 15' designate brake rods which are threaded at both ends to adjustably receive threaded yokes 16 and 16'. These yokes are drilled to receive yoke pins 17 and 17'. These brake rods 15 and 15' with the yokes with their respective yoke pins, form links between the bell crank arms 14 and 14' and the brake arms of the trailer wheel brakes, adapted to permit a rocking or revolvable motion of the rotatable shaft 12 and the trailer brake arms, as the trailer moves forward and backward along the tongue member 1. The trailer brake arms are not new nor a part of my invention, and the same may be of any form, nature or attachment to the trailer brakes which may be used in the various trailers upon which the invention may be installed. I do not, therefore, attempt to show the trailer brake arms in any detail in the drawings, and no claim is made for my invention with respect thereto. The rods 15 and 15' and their respective yokes 16 and 16' are attached by threaded attachments, thus permitting the length of the links to be shortened or increased, whereby allowance is made for taking up the slack caused by wearing of the brake linings of the trailer brakes.

Numeral 18 designates a collarlike member, slidably mounted upon and encircling the tongue member 1 having on its forward side a half circular shaped flange 18' extending forwardly along and shaped to fit the tongue member. At two or more suitable pieces, the said flange is drilled and threaded to receive threaded, wing set screws 19—19. The collar 18 with its complementary members is adapted to be moved forward or backward and anchored at any desired position upon the tongue member 1 between the front chassis frame member and the forward attachment of the tongue to the tractor. The major functions and adaptation of the flanged collar member 18—18' are to lock the trailer chassis frame with all its members, mountings and superstructures and the hanger members 4, 4' and 4" together in a fixed relationship, when it is desired to back the tractor and trailer, without setting the trailer brakes, as will hereinafter be more fully shown in the explanation of the operations of the invention. In Fig. 6, this member is shown positioned and locked with the rearward face thereof in close contact with the forward face of hanger member 4", the latter member being in its pulling position on the tongue, and the whole mechanism being, in such case, in non-braking relation with the trailer brakes.

In this preferred embodiment of my invention, as herein shown and described, the numerals 20 designate bearing bosses made integral with the respective hanger brackets 4, 4' and 4" for the bearing apertures 22 therein, as more particularly shown in Fig. 7, each of said hanger brackets having like apertures through which to mount and insert the tongue member 1.

The numerals 21 designate set screws, the function of which being to anchor the respective stop collars 5, 5' and 5" and 5'" in any desired position along the tongue 1, e. g., as shown in Fig. 1, members 5 and 5", the same being anchored in close fixed contact with the rear sides of hanger bosses, with the device in pulling operation.

Numeral 23 designates a coil compression spring, interposed around tongue member 1 and fixedly attached at its respective ends to hanger bracket 4' and stop member 5'. As will be hereinafter more particularly explained, the function of this spring is to constitute a cushion which softens and absorbs the shock caused by the sudden stopping and starting of the trailer car, when its brakes are suddenly and abruptly applied or released by the decrease or increase of the relative speeds of tractor and trailer. The degree of effect and of the resistance to the abrupt movements of the trailer, as above referred to, may be adjusted and controlled by shifting the location of stop member 5', forward or backward along the tongue, shifting operating to alter the tension on said spring, and the amount of force required to overcome said tension. Such adjustment is effective and very desirable for the purpose of accommodating the mechanism to varying loads and the requirements of different trailers upon which the invention may be installed.

The operation of the invention and the functions of its various parts are as follows:

The forward end of the trailer tongue member 1 is hitched to the rearward member of a tractor by any suitable ball and socket connection, such as is now in common use in the art for coupling tractors and trailers, the said connecting member being fixedly attached to the forward end of the said tongue member, substantially as shown in the drawings, notably in Fig. 2 and Fig. 3. No claim of invention is made with respect to the said ball and socket hitch.

In the preferred embodiment of the invention, which I have illustrated in my drawings and specification, I use for the tongue member 1 a round, metal cylinder or pipe, of such diameter as the load contemplated for it to carry dictates. However, I do not limit myself or the invention to the use of a hollow pipelike tongue member, as this member may be made of any desirable shaped bar. The journal members, hangers, and apertures for mounting the tongue, as hereinafter described, being shaped to accommodate the shape of the bar used for the purpose. The tongue member is swivelly attached to the tractor, substantially as shown, and extends longitudinally, underneath and along, the trailer chassis and midway thereof, from the place of its hitch to the tractor to the lower end of the spur member 6, which is fixedly attached to or made integral with the tongue member.

The tongue member 1 through its spur attachment 6 is connected to the brake bar oscillating arm 11 by a connecting link 8 which is fitted with threaded yokes 9 and 9' which are secured in place by yoke pins 7 and 7'. These threaded means of connection between said spur member 6 and brake bar oscillating arm 11 provide for the shortening or lengthening of the link 8 and thus providing for adjustments such as may be required in the application of the device to different makes or models of trailers.

The brake bar oscillating member 11 is fixedly attached at its lower end to the rotatable brake operating shaft 12 by a clamping means, or by any other method commonly in use in such cases. The member 11 is fixed to the member 12 in such manner as will cause the former to oscillate, either forward or backward, as the case may be, by the movements of the trailer, and thus, rotating the member 12 in its journal mountings 13—13' on the respective sides of the trailer chassis, substantially as shown in Fig. 5.

It will be observed that the adjusted distance between the respective points of attachment of the forward end of the tongue member to the tractor and the rearward end of the connecting link 8 to the brake bar oscillating member 11 at 7', always remains constant, regardless of the backward or forward movements of the trailer along the tongue member, as will be more fully described later herein. This fact of the fixed and constant distance between said points, as described, and the fact that the trailer proper moves forward and backward with relation to its position on the tongue to a determined and controlled degree, according to travelling conditions of tractor and trailer, cause the oscillating of the brake bar oscillating member 11, and consequently, a partial backward and forward rotation movement of the rotatable brake operating shaft 12.

Bell crank arms 14—14' are fixedly attached to either end of the rotatable shaft 12 and oscillate with rotating movements of the shaft.

Connecting links 15—15' threaded at either end, are attached to the lower ends of the said bell cranks 14—14' and to the brake operating levers of the wheel brakes on the trailer wheels, by threaded yokes 16—16' and their accompanying yoke pins 17—17'.

Thus, it will be observed that when the trailer and its chassis move forward in relation to the trailer tongue 1, which movement will be more fully described presently herein, the position of the rotatable shaft 12 moves forwardly as respects its position and relation to the upper end of the brake bar oscillating member 11. This causes shaft 12 to turn anti-clockwise in its bearings, and the bell crank members 14—14' to turn forwardly, thus pulling forward connecting links 15—15', and finally, pulling forwardly the brake operating arms of the trailer wheel brakes, setting the brakes against the brake drums.

When the movement of the trailer chassis is rearwardly, with respect to its relation with the tongue 1 it is obvious that the respective movements and actions of all the members, as above described, are reversed and the result being that the trailer wheel brakes are thereby released.

As regards the other members of the device, and their various functions and co-ordination with those members already described, I will now make a more detailed and complete explanation.

The tongue member 1 in addition to its attachment and suspension by means of the trailer hitch at its forward end, as shown, is further held in suspended position throughout its full length by the several hanger brackets 4, 4' and 4'' and the journal apertures therein 22 (see Fig. 7), the said tongue member being slidably mounted through said apertures.

Whenever, in the course of travel, the tractor member of the train tends to reduce its speed, as when approaching and descending a decline in the roadway (see Fig. 4), or when the operator essays to bring the tractor to an abrupt stop by applying the tractor brakes, the momentum of the trailer tends to cause it to crowd forward and thrust itself against the tractor.

In my device, were it not for certain means, in the nature of stop members, employed as controls and regulators, hereinafter more fully described, the trailer, in the constantly reoccurring changes of speed of travel, could and would move freely and unrestrained along the tongue, and jam against the rear of the tractor, or if the tractor speed should be suddenly increased beyond that of the trailer, then the tongue might be pulled free from the combined mechanisms.

The range of free and unlimited distance of movement of the trailer, both forwardly and backward, along the tongue is controlled and regulated and adjusted by the stop members 5, 5', 5'' and 5'''.

When the tractor and trailer are moving at equal speeds and the tractor is pulling on the trailer, the stop members 5—5'' and 5''' being fixedly attached in a predetermined position on the tongue by set screws 21 are dragged forward with the tongue until they are respectively in close, pulling contact with the rear sides of hanger members 4'', 4' and 4. The trailer car tongue cannot move forward through the tractor hangers further than is permitted by these stop members. The movability of these stop members permits of adjustment of the range of movement of the trailer, as above described, so that the device may be, in this particular, more readily accommodated to different types and models of trailers.

It will be further observed that by loosening the set screws 21 the stop members may be moved and reset at any desired position on the tongue member 1 thus permitting an extreme nicety in adjustment of movement along the tongue by the trailer, which, in turn, governs the range of the throw of the brake levers on the trailer wheels; this adjustment being necessary in order to take up the slack caused by wear of brake linings, and to adapt the braking operations of the device to various makes of tractors and trailers.

When the tractor suddenly decreases its speed for any expediency of travel or emergency, the tongue member 1 being restrained in longitudinal movement, contrary to the movement of the tractor, by its attachment thereto, is thrust rearwardly through the journal bearings in the hanger brackets, this movement actuating the device so as to set the trailer brakes, as hereinbefore described. Normally, by means of the various adjustments provided for in the device insuring constant efficiency of the trailer brakes, the automatic application of the trailer brakes by the backward thrust of the tongue, when the tractor speed is suddenly decreased to less than that of the trailer, serves to immediately control and diminish the trailer speed to the exact speed of the tractor.

However, the control of the trailer speed and the restriction of its forward movement against the tractor, beyond desired and predetermined limits, is not wholly left to or dependent upon the trailer brakes. In addition to the control of the trailer brakes, whenever the trailer has moved forward along the tongue to the required, predetermined and adjusted position, where, normally the trailer brakes are sufficiently applied, then the stop members 18 and 5' are adjusted in position and moved to and anchored by the set screws 19 and 21 at such position on the tongue as will prevent further forward movement of the trailer along the tongue. At such point, the cushion spring member, 23, having been so adjusted, is compressed to a closed condition by the forward movement of the hanger bracket 4' as it is carried forward by the chassis of the trailer, and by reason of the spring being restrained against the stop member 5' which is anchored to the tongue at a predetermined and adjusted position, by a set screw, 21, thus barring the further forward movement of the trailer along the tongue. The forward movement of the trailer along the tongue member is further likewise stopped by the contact of the hanger bracket 4" with the collar 18.

The excessive rearward travel of the trailer along the tongue, when its movement is reversed, is in similar manner governed, controlled and restricted, as desired, by stop members 5, 5" and 5"' when the rear sides of the respective hanger brackets 4", 4' and 4 are brought into contact with the last mentioned stop members. It will be observed that the cushion spring member 23 is fixedly attached at its rearward end to the forward side of hanger bracket 4' and at its forward end to the rearward side of stop member 5'.

Another function of the coiled compression spring member 23 is to form a cushion acting to prevent a sudden, shocking impact against stop members 5' and 18 and against the attachment of the trailer to the tractor by a sudden and severe forward movement of the trailer; or when in reverse by its rearward movement against stop members 5, 5" and 5"'.

Several functions and uses are performed by the stop member 18 in addition to that described in the preceding paragraph. This member, when anchored on the tongue by set screws 19 in the approximate position as shown by Fig. 6, combines with stop members 5 and 5' in restraining the trailer from moving farther forwardly along the tongue than the previously determined point for the proper pulling position. Furthermore, when it is desired to back the trailer with the tractor, in maneuvering for position or for any other purpose, the member 18 is moved rearwardly into fixed contact with the front frame member of the chassis, with the trailer now in towable position and with its wheel brakes free. When the member 18 is so placed and anchored in contact with the front chassis frame member, the backward thrust of the tongue and its spur member 6 and the connecting link, 8, against the rocker arm 11 is barred and the brakes on the trailer cannot then be applied. Under these conditions, the tractor and trailer may then be backed or moved forward at the driver's will, without affecting the trailer brakes either way.

In any event which makes it necessary or desirable to uncouple the tractor from the trailer and to leave the latter parked on an incline, with the trailer brakes set and locked in braking operation, the provisions of my invention are as follows: the trailer is first brought to a stand in the desired location, we will assume for the sake of this description, with its forward end facing downwardly on the inclined surface. The movable stop member 18 is then moved backwardly on the tongue until it firmly contacts the face of the front chassis frame member, in which position the stop member is anchored fixedly to the tongue member by set screws 19. It is obviously then necessary to tie the chassis securely against backward movement on the tongue, as such movement would release the trailer brakes and permit the trailer to drift downwardly on the incline. I provide against this contingency by the use of a short cable 24 looped at either end, the loop at one end being thrown over the upward extension of the front winged set screw 19 and the other loop attached through the screw eye member 25 attached to the front frame member of the trailer chassis. Any means of anchoring the trailer and the tongue member 1 fixedly and securely against rearward movement of the chassis, or forward movement of the tongue member, under the conditions here described, may be adopted. I show my preferred means of accomplishing the purpose, as above described in Fig. 9. It is further obvious that the trailer brakes may be so locked at any time or place and under any conditions where it is desired to uncouple the tractor from the trailer.

Having thus set forth my invention, and stated its principal purposes, describing its unique and useful features, and the means of accomplishing my desired ends, what I claim and desire to secure by Letters Patent is:

1. Draft and brake mechanism for a towed vehicle comprising a brake mechanism thereupon, a tongue member having the movement to and fro of the tractor vehicle, a spur member fixedly attached to the rearward end of said tongue member, a shaft member revolvably mounted transversely on the towed vehicle frame, an actuating arm fixedly mounted midwise upon said shaft member, a longitudinally adjustable, rigid link member, oscillatingly connecting said spur member to said shaft actuating arm, bell-crank arms fixedly mounted upon either end of said shaft member, longitudinally adjustable link members, oscillatingly connecting the said bell-crank arms to the respective brake operating levers of the braking mechanism; pendently mounted upon the towed vehicle frame a plurality of hanger brackets having perforations therein adapted for the insertion therethrough and the suspension therein of the said tongue member, fixedly and adjustably mounted on said tongue member a plurality of stop members adapted to limit the relative movement to and fro of the tongue member and tractor vehicle with reference to the towed vehicle.

2. The combination with a tractor vehicle and a towed vehicle, comprising a tongue member swivelly attached at its forward end to the tractor vehicle and having a movement to and fro of the tractor, pendently mounted upon the towed vehicle frame a plurality of hanger brackets having perforations therethrough adapted for the insertion and suspension therein of said tongue member, fixedly and adjustably mounted on said tongue member a plurality of stop members adapted to govern and limit the relative movement to and fro of the tongue member and tractor vehicle with reference to the towed vehicle, a brake mechanism upon the towed vehicle, a spur member fixedly attached to the rearward end of said tongue member, a shaft member revolvably mounted transversely on the towed vehicle frame, an actuating arm fixedly mounted midwise upon said shaft member, a longitudinally adjustable, rigid link member, oscillatingly connecting said spur member to said shaft actuating arm, bell-crank arms fixedly mounted upon either end of said shaft member, longitudinally adjustable link members, oscillatingly connecting the said bell-crank arms to the respective brake operating levers of the braking mechanism.

3. The combination as provided in claim 2 in which there is provided a coil compression spring concentrically mounted on the said tongue member and being fixedly attached at its forward end to a stop member fixedly mounted on said tongue member and being fixedly attached at its rearward end to a hanger bracket mounted on the frame of the towed vehicle, the said spring member adapted to provide a resilient means for cushioning the action of said draft means in its to and fro movements.

4. In a towed vehicle, a brake mechanism for braking the towed vehicle in accordance with the operation of the tractor vehicle, said brake mechanism comprising a tongue member having the movement to and fro of the tractor vehicle, a spur member fixedly attached to the rearward end of said tongue member, a shaft member revolvably mounted transversely on the towed vehicle frame, an actuating arm fixedly mounted midwise upon said shaft member, a longitudinally adjustable, rigid link member, oscillatingly connecting said spur member to said shaft actuating arm, bell-crank arms fixedly mounted upon either end of said shaft member, longitudinally adjustable link members, oscillatingly connecting the said bell-crank arms to the respective brake operating levers of the braking mechanism; pendently mounted upon the towed vehicle frame a plurality of hanger brackets having perforations therein adapted for the insertion therethrough and the suspension therein of the said tongue member, fixedly and adjustably mounted on said tongue member a plurality of stop members adapted to limit the relative movement to and fro of the tongue member and tractor vehicle with reference to the towed vehicle.

5. The combination with a tractor vehicle and a towed vehicle having a body structure, of draft and brake mechanism comprising a tongue member swivelly attached at its forward end to the tractor vehicle and having a movement to and fro of the tractor, pendently mounted upon the towed vehicle frame a plurality of hanger brackets having perforations therethrough adapted for the insertion and suspension therein of said tongue member, fixedly and adjustably mounted on said tongue member a plurality of stop members adapted to govern and limit the relative movement to and fro of the tongue member and tractor vehicle with reference to the towed vehicle, a brake mechanism upon the towed vehicle, a spur member fixedly attached to the rearward end of said tongue member, a shaft member revolvably mounted transversely on the towed vehicle frame, an actuating arm fixedly mounted midwise upon said shaft member, a longitudinally adjustable, rigid link member, oscillatingly connecting said spur member to said shaft actuating arm, bell-crank arms fixedly mounted upon either end of said shaft member, longitudinally adjustable link members, oscillatingly connecting the said bell-crank arms to the respective brake operating levers of the braking mechanism, and means associated with said draft member for limiting the movement of said draft member in said opposite direction to couple said body and draft member for unitary movement in said opposite direction.

6. The combination as provided in claim 5 in which means are provided for fixedly coupling and anchoring the said tongue member to said body structure, following movement of said tongue member in a brake releasing position.

7. The combination as provided in claim 5 wherein is provided a collarlike member, slidably mounted upon and encircling the tongue member forwardly of the body structure, having a forwardly extending flange and selectively operable means for anchoring said member at any desired position on said tongue member, following movement of said tongue member in a brake releasing position.

8. The combination as provided in claim 5, in which means are provided for fixedly coupling and anchoring the said tongue member to the said body structure following movement of said tongue member in a brake applying position.

9. The combination as provided in claim 5, in which is provided a ringbolt attached to the forward end of said body structure, a wingbolt attached to the tongue member and a link connecting said ringbolt and wingbolt adapted so as to hold the tongue member against movement to release the brakes of the towed vehicle, substantially as shown.

LLOYD E. LATTA.